March 13, 1956
E. S. BALCEREK ET AL
2,738,037
EMERGENCY BRAKE SYSTEM
Filed Jan. 14, 1955
2 Sheets-Sheet 1
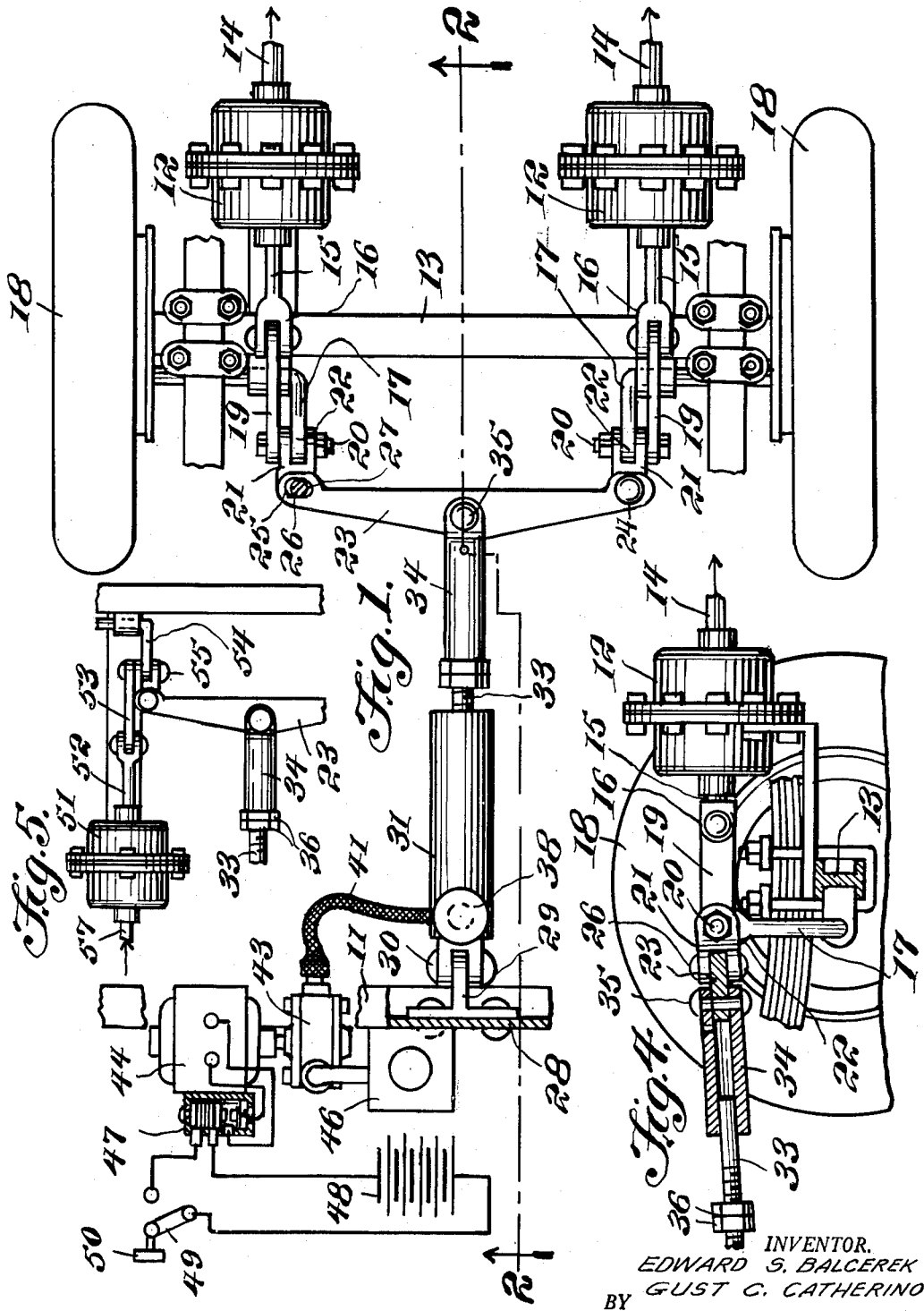
INVENTOR.
EDWARD S. BALCEREK
GUST C. CATHERINO
BY McMorrow, Berman + Davidson
ATTORNEYS

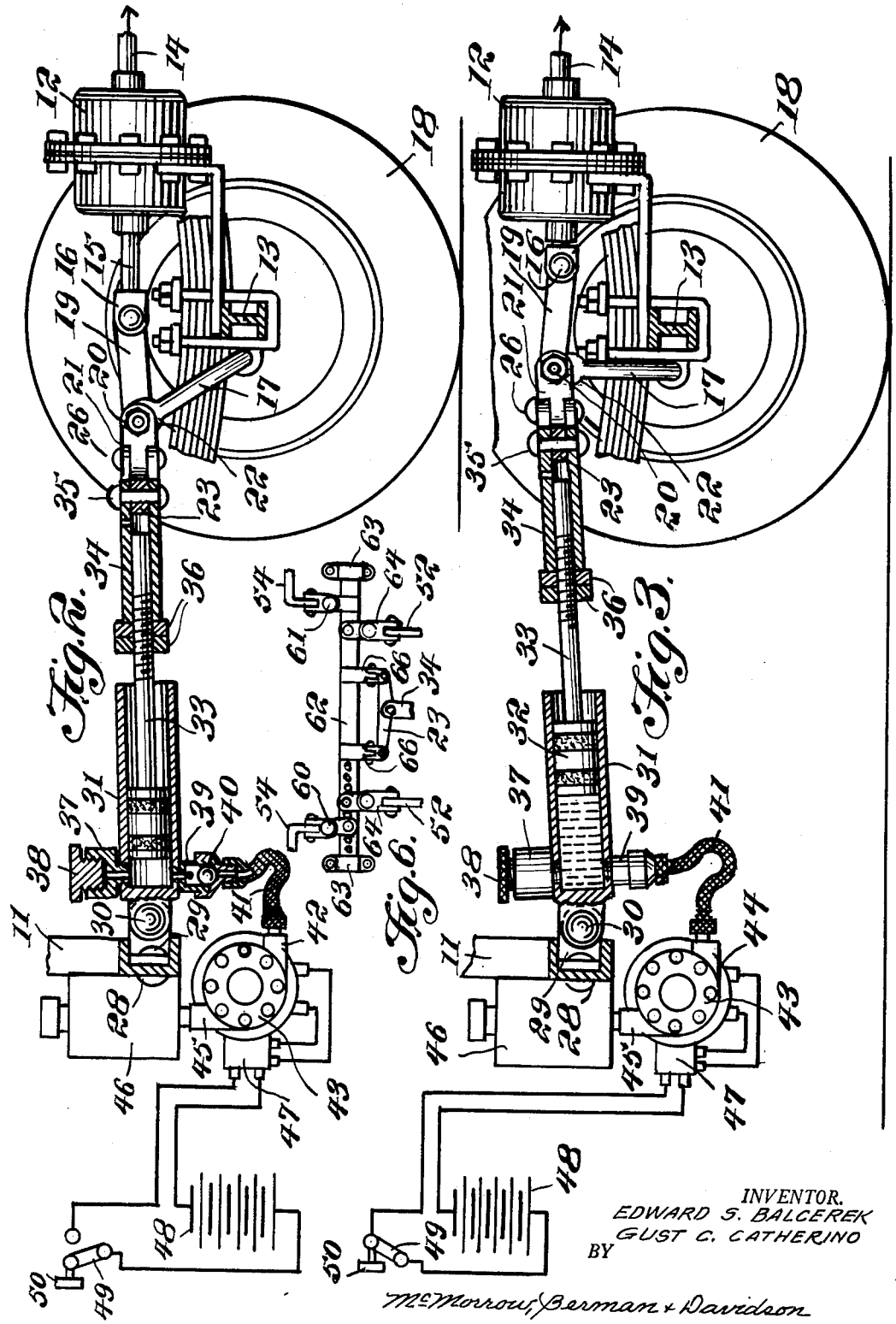

United States Patent Office 2,738,037
Patented Mar. 13, 1956

2,738,037

EMERGENCY BRAKE SYSTEM

Edward S. Balcerek and Gust C. Catherino, Pittsburgh, Pa.

Application January 14, 1955, Serial No. 481,732

2 Claims. (Cl. 188—106)

This invention relates to braking systems, and more particularly to an improved emergency braking system for a vehicle having a fluid brake system, the emergency brake system being operable whenever the normal vehicle brake system fails.

The main object of the invention is to provide a novel and improved emergency brake system for use in conjunction with the conventional fluid pressure brake system of a vehicle, the improved emergency system being simple in construction, being easy to install, and being arranged so that it does not interfere with the normal operation of the vehicle brakes.

A further object of the invention is to provide an improved emergency brake system for a vehicle having a conventional fluid brake system, the emergency brake system involving inexpensive parts, being durable in construction, being reliable in operation, and providing a means of stopping the vehicle equipped therewith in the event of failure of the normal fluid pressure brake system, thus greatly reducing the hazards of accidents which would otherwise occur as a result of failure of the normal fluid brake system of the vehicle.

Further objects and advantages of the invention will become apparent from the following description and claims, and from the accompanying drawings, wherein:

Figure 1 is a horizontal cross sectional view taken through a fragmentary portion of a vehicle provided with an improved emergency brake-operating system according to the present invention, and showing the schematic connections of the electrical portions of the circuit included in the system.

Figure 2 is a vertical longitudinal cross sectional view taken on the line 2—2 of Figure 1.

Figure 3 is a longitudinal vertical cross sectional view similar to Figure 2, but showing the system in its operative position, whereby the vehicle brakes are applied.

Figure 4 is a fragmentary cross sectional view, similar to Figure 2, and showing the relative positions of the piston rod of the emergency brake-operating system and the tubular sleeve receiving said rod when the normal fluid pressure brake system of the vehicle is operated, and illustrating how the normal operation of the vehicle brakes may be obtained without interference from the emergency brake system of the present invention.

Figure 5 is a fragmentary top plan view, to a reduced scale, of one side portion of the frame of a vehicle equipped with air brakes and provided with an improved emergency brake-operating system according to the present invention.

Figure 6 is a fragmentary plan view, also to a reduced scale as in Figure 5, of a modified form of installation of the emergency brake-operating system of the present invention on a vehicle equipped with air brakes.

Referring to the drawings, and more particularly to Figures 1 to 4, 11 designates the frame of a vehicle having a conventional fluid pressure brake system, for example, a system of the vacuum type, the brake system including the vacuum chambers 12, 12 which are located rearwardly adjacent the rear axle 13 of the vehicle and which are suitably supported on the vehicle frame. The brake chambers 12 are of conventional construction and are connected to suitable vacuum means by conduits 14, 14, said vacuum means being controlled by valve means well known in the art, so that when the chambers 12 are connected to the source of vacuum, the operating pistons or rods 15 of the brake chambers 12 are retracted, namely, are moved to the right, as viewed in Figure 1.

The rods 15 have clevis members 16 at their forward portions and are connected to the respective brake operating arms 17, 17 associated with the respective brakes mounted on the vehicle structure adjacent the respective wheels 18, 18, and being conventional in construction. Thus, the respective clevis members 16 may be connected to the ends of the respective arms 17 by respective link bars 19, as shown in Figures 1, 2 and 3.

The respective link bars 19 are connected to the ends of the respective arms 17 by transverse pivot bolts 20, 20. Designated at 21, 21 are respective bracket members which are pivotally connected to the joined ends of the members 17 and 19 at the respective pivot bolts 20, the members 21 being, for example, provided with parallel apertured pivot arms which are disposed on opposite sides of the respective eye portions 22 of the members 17, as shown in Figure 1, and through which the respective pivot bolts extend. Thus, the respective bracket members 21, 21 are rotatable around the common transverse horizontal axis of the pivot bolts 20, 20. Designated at 23 is a transversely extending bar member which is pivotally connected at 24 to one of the bracket members 21 and which is slidably and pivotally connected at 25 to the other bracket member 21. Thus, the pivotal connection 24 may comprise a vertical pivot bolt extending through one end of the transverse bar member 23 and the associated bracket member 21, whereas the pivotal connection 25 may comprise a pivot bolt, shown at 26, extending through the other bracket member 21 and through a transversely directed slot 27 provided in the end of the bar member 23, allowing the bar member 23 to rotate, as well as to slide transversely with respect to the pivot bolt 26.

Secured to a transversely extending frame member 28 of the vehicle forwardly of the transverse bar member 23 is a bracket 29, and pivoted to said bracket at 30 is a fluid cylinder 31, the pivotal connection 30 being on a transverse horizontal axis, whereby the cylinder 31 may rotate freely around said axis. Slidably mounted in the cylinder 31 is the piston 32, and rigidly connected to said piston 32 is the axially extending piston rod 33. The piston rod 33 is slidably received in a tubular arm 34 which is pivotally connected at 35 to the intermediate portion of the transverse bar member 23, the pivotal connection 35 being on a vertical axis, as shown in Figure 2. The piston rod 33, however, is free to rotate around its own axis in the tubular member 34.

Threadedly engaged on the piston rod 33 are the nuts 36, 36 which may be adjusted in position and tightened against each other to lock them in adjusted position, thereby defining stop means limiting the movement of the piston rod into the tubular link member 34. Thus, the nuts 36 may be adjusetd to allow the piston rod 33 to move inwardly into the tubular link member 34 to the position thereof shown in Figure 3, at which position the nuts 36 engage against the end of the tubular link 34 and allow thrust to be transmitted directly from the piston 32 to the tubular link 34.

The forward end of the cylinder 31, namely, the end thereof adjacent the pivotal connection 30, is provided with an outlet fitting 37 which is generally cup-shaped and which is internally threaded to receive the removable screw plug 38. Said end portion of the cylinder 31 is provided with an inlet fitting 39 which is connected through a ball check valve 40 to a flexible conduit 41. The flexible conduit 41 is connected to the outlet end 42 of a fluid compressor or pump 43 suitably mounted on the frame of the vehicle. Designated at 44 is an electric motor which is drivingly coupled to the fluid pump 43. The inlet end 45 of the fluid pump 43 is connected to a fluid reservoir 46 which contains suitable hydraulic fluid and which is mounted above the level of the pump 43, whereby the hydraulic fluid in the tank 46 will flow by gravity to the inlet portion 45 of the pump.

The motor 44 is connected through contacts of a relay 47 to a battery 48, which may be the vehicle battery. The operating winding of the relay 47 is similarly connected to the battery 48 through the contacts of a manually operated emergency switch 49. For example, the switch 49 may be mounted on the floor board of the vehicle and may be operated by means of a foot pedal 50.

It will be understood that the motor 44 is thus controlled in a conventional manner by the relay 47, so that when the relay winding is energized by closing the emergency switch 49, the relay contacts will close and will energize the motor 44, causing the motor to drive the pump 43. Operation of the pump 43 causes the hydraulic fluid to be forced into the cylinder 31, forcing the piston 32 outwardly, and causing the rod 33 to be moved into the tubular link 34. After a predetermined amount of inward movement of the piston rod 33 into the tubular link arm 34, the nuts 36 come into abutment with the end of the tubular link arm 34, whereby the piston 32 directly transmits thrust to the link arm 34, and whereby the continued extension of the piston 32 causes the brake operating arms 17 to be rotated clockwise, as viewed in Figure 2, to the position of Figure 3, causing the vehicle brakes associated with the wheels 18, 18 to be applied. The fluid in the cylinder 31 will be trapped in the cylinder by the action of the check valve 40, and therefore the brakes will remain in applied positions until the removable plug 38 is unscrewed, allowing the fluid to be discharged from the cylinder 31.

When the brakes are operated by their normal means, namely, the vacuum chambers 12, 12, the arms 17 are free to rotate since the tubular member 34 is freely slidable on the piston rod 33 under these conditions. Thus, the emergency brake system does not interfere in any way with the operation of the normal brake operating means of the vehicle.

Figure 5 illustrates the application of the invention to a vehicle having a fluid pressure brake system, for example, having an air pressure chamber 51 provided with the brake actuating piston rod 52 connected by a link arm 53 to the brake operating arm 54, these elements being arranged on the opposite sides of the vehicle as in the case of the vacuum brake system described in Figures 1 to 4. In the arrangement of Figure 5, the transversely extending bar member 23 may be connected to the link arms 53 and the brake operating arm 54 at their pivotal connections 55, as shown. Thus, when fluid under pressure is delivered to the chambers 51 through the fluid inlet conduits 57, the rods 52 are moved to the right, as viewed in Figure 5, causing the vehicle brakes to be applied. In the event of emergency, the emergency piston rod 33 is moved into the sleeve-like link 34, as in the previously described form of the invention, causing the nuts 36 to engage the end of the tubular link 34 and thus causing the piston rod 33 to transmit direct thrust to the transverse bar members 23, which in turn causes the brake-operating arms to be rotated to apply the vehicle brakes.

Figure 6 illustrates a modified arrangement, generally similar to Figure 5, but wherein the brake-operating arms are pivotally connected to respective bracket members 60, 61. The bracket member 61 is secured to one end of a transversely extending rotary shaft member 62, and the bracket member 60 is adjustably secured to the opposite end portion of said transverse shaft 62, the shaft being journaled at its opposite ends in respective bearing brackets 63, 63 provided at the opposite side portions of the frame of the vehicle. The brake operating pistons 52 are connected to similar arms 64, 64 secured on the shaft 62, whereby the shaft will be rotated when the pistons 52 are actuated by their respective cylinders, as in the structural arrangement of Figure 5. Rotation of the shaft 62 is transmitted by the bracket arms 60 to the brake-operating arms 54, thus causing the brakes to be applied. Connected to a pair of arms 66, 66 secured to the intermediate portion of the shaft 62 is a transversely extending bar member 23, and pivotally secured to the intermediate portion of the bar member 23 is the tubular link member 34, as in the previously described forms of the invention.

As in the previously described forms of the invention, when the piston rod 33 is extended outwardly sufficiently to cause the nuts thereon to engage the end of the tubular link 34, thrust will be transmitted to said tubular link, causing the bar member 23 to transmit said thrust to the arms 66, 66, and thence to the shaft 62, causing said shaft to be rotated, and causing the brake-operating arms 54, 54 to be moved to apply the vehicle brakes.

While certain specific embodiments of an improved emergency brake system for a vehicle have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a vehicle having a fluid brake system of the type including a brake-operating arm and fluid pressure-controlled means for controlling said arm, an emergency brake-applying mechanism comprising a fluid-pressure cylinder mounted on the vehicle, a piston in said cylinder, a tubular link member connected to said brake-operating arm, a piston rod connected to said piston and slidably received in said tubular link member, stop means on said piston rod limiting the movement of said piston rod into said tubular link member, whereby said piston may transmit thrust to said link member, a fluid compressor pump, means connecting the outlet of said pump to said cylinder, an electric motor drivingly connected to said pump, a source of current, a control switch, and circuit means connecting said source of current to said motor through said control switch.

2. In a vehicle having a fluid brake system of the type including respective rotary brake-operating arms on opposite sides of the vehicle arranged to operate the brakes of respective wheels at their opposite sides and fluid pressure-controlled means for actuating said arms, an emergency brake-applying mechanism comprising a transversely extending bar member, means pivotally connecting the opposite end portions of said bar member to said arms, a fluid pressure cylinder mounted on the vehicle, a piston in said cylinder, a tubular link member pivotally connected to the intermediate portion of said bar member, a piston rod connected to said piston and slidably received in said tubular link member, stop means on said piston rod limiting the movement of said piston rod into said tubular link member, whereby said piston may transmit thrust to said link member, a fluid compressor pump, means connecting the outlet of said pump to said cylinder, an electric motor drivingly connected to said pump, a source of current, a control switch, and circuit means connecting said source of current to said motor through said control switch.

References Cited in the file of this patent

UNITED STATES PATENTS

| 2,185,261 | Laupold | Jan. 2, 1940 |
| 2,680,500 | Jenkins | June 8, 1954 |